(12) United States Patent
Dahlheimer (10) Patent No.: US 8,961,164 B2
(45) Date of Patent: Feb. 24, 2015

(54) CUTTER HEAD HOLDER OF AN UNDERWATER GRANULATOR

(75) Inventor: Stefan Dahlheimer, Kleinostheim (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 141 days.

(21) Appl. No.: 13/372,427

(22) Filed: Feb. 13, 2012

(65) Prior Publication Data

US 2012/0164255 A1    Jun. 28, 2012

(51) Int. Cl.
  *B29B 9/06* (2006.01)
(52) U.S. Cl.
  CPC . *B29B 9/06* (2013.01); *Y10S 425/23* (2013.01)
  USPC .......... 425/142; 425/69; 425/192 R; 425/307; 425/311; 425/DIG. 230; 264/142; 264/143; 83/356.3; 83/698.41
(58) Field of Classification Search
  CPC ............ B29B 9/02; B29B 9/06; B29B 9/065; B26D 7/26; B26D 7/2614; B26D 7/2621; B26D 7/2628; B26D 7/2635; B26D 7/265; B26D 5/02; B26D 2001/0006; B26D 2003/283; B26D 2005/00; B26D 2007/00; B26D 2007/0012; B26D 2007/01; B26D 2007/26; B26D 2007/2607; B26D 2007/2657; B29C 2793/00; B29C 2795/007
  USPC ............... 425/67, 68, 70, 307, 308, 310, 311, 425/313, 382.3, 142, 150, 168, 202, 425/DIG. 230, 69, 192; 264/142, 143, 40.1, 264/40.5; 83/356.3, 698.11, 698.41
  See application file for complete search history.

(56) References Cited

U.S. PATENT DOCUMENTS

| | | | | |
|---|---|---|---|---|
| 3,685,751 A | * | 8/1972 | Anders | 425/171 |
| 3,832,114 A | | 8/1974 | Yoshida | |
| 3,912,434 A | * | 10/1975 | Nagahara et al. | 425/142 |
| 4,019,414 A | * | 4/1977 | Thomas et al. | 83/356.3 |
| 4,021,176 A | * | 5/1977 | Dettmer et al. | 425/313 |
| 4,529,370 A | * | 7/1985 | Holmes et al. | 425/142 |
| 4,614,307 A | * | 9/1986 | Lauser | 241/101.4 |
| 5,059,103 A | | 10/1991 | Bruckmann et al. | |
| 5,110,523 A | * | 5/1992 | Guggiari | 264/40.5 |
| 5,360,585 A | * | 11/1994 | Ishida et al. | 264/40.1 |
| 5,435,713 A | * | 7/1995 | Yamasaki et al. | 425/311 |
| 5,527,176 A | * | 6/1996 | Ishida | 425/142 |
| 5,587,186 A | * | 12/1996 | Voigt | 425/310 |
| 6,217,802 B1 | * | 4/2001 | Messina et al. | 264/40.1 |
| 6,443,722 B1 | * | 9/2002 | Castelli et al. | 425/145 |
| 7,007,559 B2 | * | 3/2006 | Klammer et al. | 73/862.08 |
| 7,033,152 B2 | * | 4/2006 | Eloo et al. | 425/67 |
| 7,273,365 B2 | * | 9/2007 | Murb | 425/67 |
| 7,997,887 B2 | * | 8/2011 | Makida et al. | 425/202 |
| 8,083,509 B2 | * | 12/2011 | Holmes et al. | 425/67 |
| 8,317,504 B2 | * | 11/2012 | Garbe | 425/169 |
| 2003/0213352 A1 | * | 11/2003 | Konno et al. | 83/698.41 |
| 2004/0080066 A1 | * | 4/2004 | Klammer et al. | 264/40.1 |
| 2006/0121139 A1 | * | 6/2006 | Murb | 425/67 |

FOREIGN PATENT DOCUMENTS

CN   1543393 A   11/2004
DE   2307266 A   11/1973

(Continued)

*Primary Examiner* — Seyed Masoud Malekzadeh
(74) *Attorney, Agent, or Firm* — Buskop Law Group, PC; Wendy Buskop (57) ABSTRACT

A cutter head holder for blades of an underwater granulator for granulating pellets from a plastic melt that emerges from a perforated plate into a process chamber of a housing of an underwater granulator.

14 Claims, 4 Drawing Sheets

(56) References Cited

FOREIGN PATENT DOCUMENTS

| | | | |
|---|---|---|---|
| DE | 2638126 | A1 | 3/1978 |
| DE | 69013284 | T2 | 2/1995 |
| DE | 19846286 | A1 | 4/2000 |
| DE | 20300009 | U1 | 5/2004 |
| GB | 2132549 | A | 7/1984 |
| WO | 2007147162 | A2 | 12/2007 |
| WO | 2010021814 | A2 | 2/2010 |

* cited by examiner

CUTTER HEAD HOLDER OF AN UNDERWATER GRANULATOR

CROSS REFERENCE TO RELATED APPLICATIONS

The present application claims priority to and the benefit of International Patent Application No. PCT/EP2010/004952, filed on Aug. 12, 2010, entitled "CUTTER HEAD HOLDER OF AN UNDERWATER GRANULATOR" which claims priority to German Patent Application No. 10 2009 037 398.5, which was filed on Aug. 13, 2009. These references are hereby incorporated in their entirety.

FIELD

The present embodiments generally relate to a cutter head holder for blades of an underwater granulator for granulating pellets from a melt that emerges from a perforated plate into a process chamber in the housing of the underwater granulator, having a cutter shaft that can be coupled to a motor shaft of a motor of the underwater granulator

BACKGROUND

A need exists for cutter head holder that reduces uneven wear caused by uneven running of a cutter assembly.

A further need exists for a cutter head holder that permits high stability and uniformity of blade motion during the granulating process in a structurally simple manner.

An additional need exists for a cutter head holder that reduces tilting or fluttering of the blades relative to the perforated plate of an underwater granulator while at the same time avoiding increased contact pressure of the blades against the perforated plate.

A further need exits for a cutter head holder that allows simple adjustability in the event of wear of the blades.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a cutter head holder for blades of an underwater granulator for granulating pellets from a melt that emerges from a perforated plate into a process chamber in the housing of the underwater granulator, having a cutter shaft that can be coupled to a motor shaft of a motor of the underwater granulator.

The cutter head holder can hold and drive one blade or multiple blades of an underwater granulator for granulating pellets. The blades can cut pellets of plastic melt, emerging from a perforated plate into a process chamber in a housing of the underwater granulator.

The cutter head holder can have a cutter shaft that can be coupled to a motor shaft of a motor of the underwater granulator. The cutter head holder can be configured to be disconnectable from the cutter shaft.

The cutter shaft can have an inner cutter shaft part and an outer cutter shaft part. The outer cutter shaft part can surround the inner cutter shaft part. The outer cutter shaft part can surround the inner cutter shaft part at least in sections, and can project past the inner cutter shaft part. A rear part of the outer cutter shaft part can project away from the perforated plate, and a forward subsection of the inner cutter shaft part on which a blade holder or the blades can be mounted, can project somewhat beyond the outer cutter shaft part. The outer cutter shaft part can surround the inner cutter shaft part over the main length of the cutter shaft thus formed, which is to say approximately 70 percent or even 90 percent to nearly 100 percent thereof. The inner cutter shaft part and the outer cutter shaft part can be axially displaceable relative to one another, and fixed rotationally relative to one another.

The outer cutter shaft part can be supported by a front support in a forward region facing the perforated plate of the underwater granulator so as to be axially displaceable relative to the inner cutter shaft part. The inner cutter shaft part can be displaceable relative to the outer cutter shaft part in the direction of the perforated plate. The inner cutter shaft part can be displaced to compensate for wear on the single blade or on the blades.

The outer cutter shaft part can be supported so as to be rotatable relative to the housing of the underwater granulator by means of at least one rotary bearing located therebetween. Consequently, the inner cutter shaft part, which is not rotatable relative to the outer cutter shaft part, can likewise perform, together with the blade or blades mounted on the inner cutter shaft part, a suitable rotary motion relative to the housing of the underwater granulator and thus also relative to the perforated plate and the nozzle openings there.

The outer cutter shaft part can be arranged such that it is not displaceable relative to the perforated plate or to the housing of the underwater granulator and/or relative to the housing of the motor. The inner cutter shaft part and the outer cutter shaft part can be arranged to be coaxial to one another with a circumferential space between them.

The cutter head holder with a cutter shaft having an inner cutter shaft part and an outer cutter shaft part that are displaceable relative to one another permits, in a structurally quite simple manner, easy adjustability in the event of wear of the blade/blades of the underwater granulator, without having to provide excessive permanent contact pressure, which would have the effect of increasing wear in the region of the perforated plate and the blades. The nested arrangement of the inner and outer cutter shaft parts with support in the front region towards the perforated plate can provide additional stabilization of the cutter shaft projecting into the process chamber. This increases the stability of the granulating process significantly, since no fluttering or tilting of the cutter shaft, and hence of the blades, takes place relative to the perforated plate.

Moreover, as a result of the functional separation of the functions of axial displacement and rotation, an appropriate axial bearing and/or guide and an appropriate rotary bearing and/or guide can be implemented separately from one another in a simple way according to the invention, each in a structurally specific and simple manner. In this regard, the axial bearing and/or guide can be located in the region toward the perforated plate, and the rotary bearing and/or guide can be located in the center of the housing of the underwater granulator or even somewhat toward the rear section of the cutter shaft, which faces away from the perforated plate, of an underwater granulator equipped with such a cutter head holder.

A front support can be implemented in the forward region of the cutter shaft of the underwater granulator toward the perforated plate in such a manner that the front support is provided in an area of up to 30 percent of the length of the inner cutter shaft part there. Thus the support is always provided at least in the forward region there of up to 30 percent of the length of the inner cutter shaft part, even when significant wear has occurred, and hence the inner cutter shaft part has been shifted axially in the direction of the perforated plate with respect to the outer cutter shaft part or with respect to the housing of the underwater granulator.

The front support can be an annular bulge on the inner cutter shaft part there. The annular bulge can be provided on the outside of the inner cutter shaft part and bear against a corresponding inner section of the outer cutter shaft part. The annular bulge can also be provided in corresponding fashion on the inside of the outer cutter shaft part and bear against the inner cutter shaft part.

The front support can be in the form of tongues and grooves that can be provided in complementary fashion in or on the inner cutter shaft part and in or on the outer cutter shaft part, wherein this axial guidance of the inner cutter shaft part with respect to the outer cutter shaft part then simultaneously includes functional prevention of the rotatability of the two cutter shaft parts with respect to one another (but not the transmission/the driving of the motion for axial displaceability). Generally speaking, another suitable construction may also ensure rotation prevention and axial guiding of the inner cutter shaft part and outer cutter shaft part with respect to one another, as will be described further below.

The front support can be a plain bearing. In consequence, other, costly bearing constructions can be avoided in a structurally simple way in this front region of the cutter shaft of the cutter head holder according to the invention.

The outer cutter shaft part can be sealed in an axially displaceable way from the inner cutter shaft part in the region of the front support by means of an axial seal, so that no process fluid can enter the space between the inner cutter shaft part and the outer cutter shaft part. The outer cutter shaft part can be rotatably sealed from the housing of the underwater granulator, or correspondingly with respect to the process chamber of the underwater granulator formed in the housing, by means of at least one rotary seal, so that no process fluid can enter there and the housing remains sealed with respect to the process fluid. Seals that are adapted individually in each case for the displaceability and for the rotatability can be used.

A driver element can be provided that connects the outer cutter shaft part and the inner cutter shaft part in such a manner that a rotational motion can be transmitted between the outer cutter shaft part and the inner cutter shaft part by the driver element.

The axial guidance of the inner cutter shaft part and outer cutter shaft part relative to one another can also be provided by the driver element. The driver element can be provided in a rear region on the cutter shaft, which is to say further away from the perforated plate of the underwater granulator than the front support. Such a driver element permits optimal transmission of the necessary rotary motion to the blades, wherein torques of considerable magnitude definitely must be transmitted in operation of a granulating device. This can be achieved through such an additional driver element with appropriate dimensioning.

In order to permit axial adjustability of the blades relative to the perforated plate of the underwater granulator when wear occurs of the blade or blades on the cutter head holder, an axial adjusting device can be provided. The axial adjusting device can be connected by the driver element to the cutter shaft. The axial adjustment device can be in the inner cutter shaft part. In consequence, the inner cutter shaft part can be axially displaced and readjusted when wear occurs, and the outer cutter shaft part can remain axially fixed in position in its rotary bearing.

The axial adjusting device can have a threaded sleeve, which is rotatable by means of a fine-pitch thread relative to the housing of the underwater granulator or the housing of the motor in such a manner that a corresponding axial displacement of the cutter shaft, takes place by means of the driver element connected to the threaded sleeve. Hence, manual adjustability and positioning, for example when blade wear has occurred, is provided in a simple way by means of the manually adjustable threaded sleeve.

The axial adjusting device can also be composed of an operating fluid section, for example implemented as a pneumatic section or a hydraulic section, which is provided with at least one cavity facing the housing of the underwater granulator and/or the housing of the motor.

The correspondingly formed variable cavity can be connected to an operating fluid source, for example a compressed air source or a source of pressurized hydraulic fluid. The inner cutter shaft part can be axially displaced relative to the outer cutter shaft part by application of pressure in the cavity this can allow for a largely automated adjustment of the blade position when blade wear occurs, and can allow for adjustability of the contact pressure of the blades on the perforated plate.

The operating fluid section can have a double acting cylinder, with a first cavity facing away from the perforated plate and a second cavity facing toward the perforated plate. A piston or piston element can be located therebetween. The operating fluid section can also have an appropriate operating fluid control device, so that an axial motion and/or application of force in the direction of the perforated plate, as well as in the direction away from the perforated plate, is made possible by the piston/piston element, providing a flexible adjustability of the contact pressure on the perforated plate by the blades standing in connection therewith is possible, and it is even possible for compensation or reduction of the contact pressure to take place by means of counter pressure on the piston in the direction away from the perforated plate to compensate for hydrodynamic forces on the blades in the direction of the perforated plate.

The driver element can be at least one drive pin, at least one section of which, for example an end section thereof, is directly or indirectly connected to the outer cutter shaft part, and at least one additional section of which is connected to the inner cutter shaft part. Hence the rotationally fixed arrangement and/or the axial guidance between the inner cutter shaft part and the outer cutter shaft part can be implemented reliably as well. In the case of an axial displacement of the inner cutter shaft part with respect to the outer cutter shaft part, this displacement can also be transmitted appropriately to the inner cutter shaft part. It is possible to provide one drive pin or multiple drive pins, for example two opposing drive pins.

The outer cutter shaft part can be coupled to the motor shaft in a rotationally fixed manner, by a feather key, which in can be located between the motor shaft and a rear section of the outer cutter shaft part (viewed with reference to the location relative to the perforated plate). Thus, it is possible in an especially flexible manner to remove the motor, for example, from the granulating device with the cutter head holder designed in this way, for example for maintenance purposes.

For maintenance purposes, the blade or the blades can also be mounted by means of a blade holder on the inner cutter shaft part of the cutter head holder. This allows for simple replacement when the blade or blades have reached the wear limit.

In addition, an underwater granulator can be suspended from a slide rail, and can be axially movable, by means of a suspension, wherein the suspension can be provided on the housing of the motor and/or on the housing of the underwater granulator itself.

The underwater granulator can have a process chamber housing section and a bearing housing section that can be attached thereto by means of a flange section and to which the housing of the motor can be attached. The housing can be attached to the motor by a screw.

The process chamber housing section and/or the flange section and/or the bearing housing section can also be designed as a single piece. The rotary bearing and/or the rotary seal of the outer cutter shaft part with respect to the housing of the underwater granulator can be provided in the region of the flange section or in the region of the bearing housing section of the housing of the underwater granulator designed in this manner. This permits a largely modular construction, in which suitable individual sections can even be replaced or repaired individually, for example when replacement of rotary bearings or rotary seals is necessary.

Figure 1:
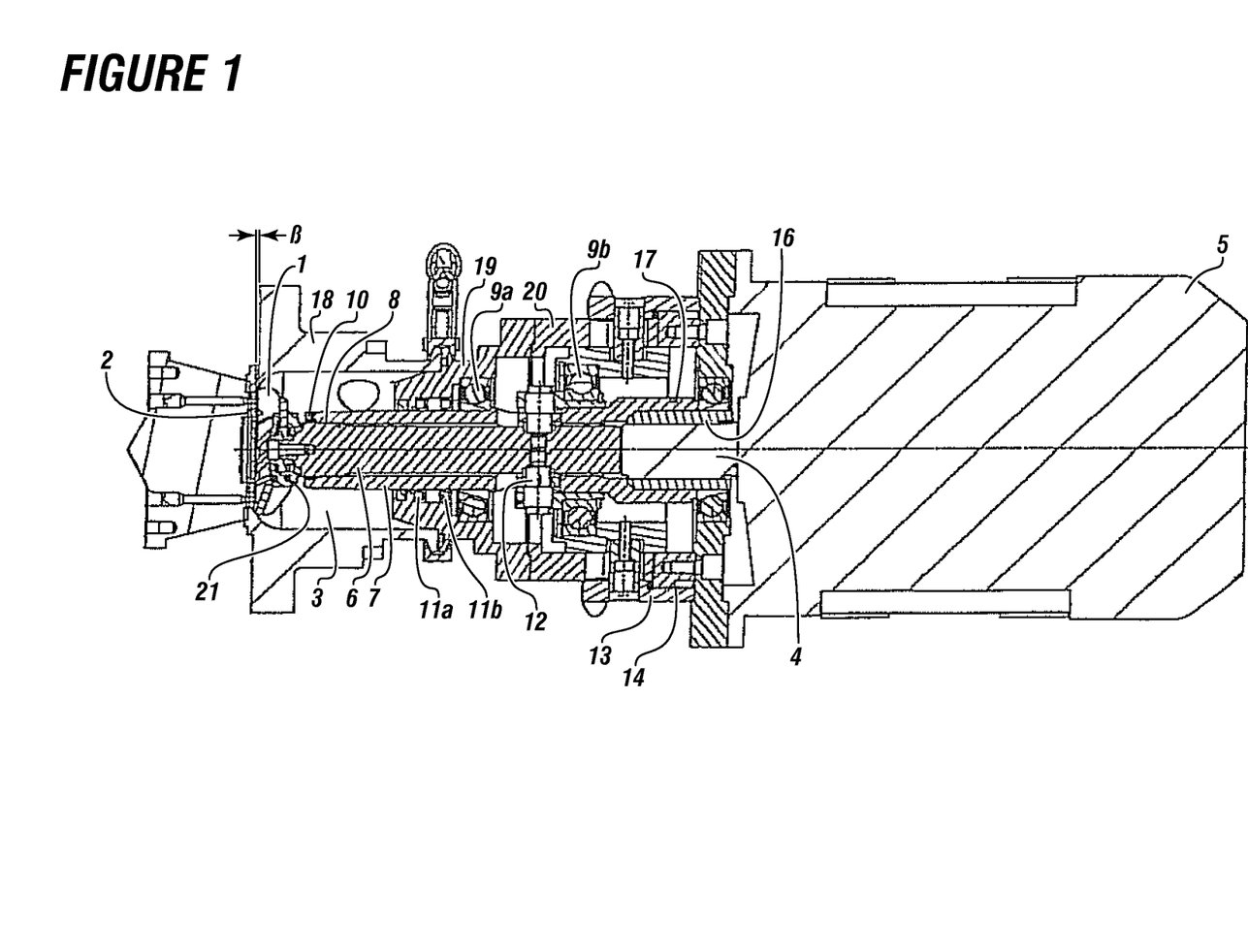
FIG. 1 depicts a schematic cross-sectional view of an underwater granulator with a manually adjustable cutter head holder according to an embodiment of the invention in the rest position.

Turning now to the Figures, FIG. 1 shows a schematic cross-sectional view of an underwater granulator with a manually adjustable cutter head holder in the rest position.

The underwater granulator shown in FIG. 1 serves to granulate pellets, for example of a plastic melt that emerges from a perforated plate 2, from the nozzle openings therein, into a process chamber 3 in the housing of the underwater granulator.

The housing of the underwater granulator can have a process chamber housing section 18, with a process chamber 3 provided therein, a flange section 19 adjacent thereto, and a bearing housing section 20 that can in turn be attached to the flange section 19. The flange section 19 and the bearing housing section 20 can also be designed as a single piece.

A housing of a motor 5 can be removable attached adjacent thereto. A process fluid, for example water, can remove the pellets that have been severed in the region of the perforated plate 2 from the region of the process chamber process chamber 3 in the housing. The process fluid can flow through the process chamber 3 in the housing of the underwater granulator during operation.

The cutter head holder can have the blades 1 mounted on a cutter shaft. The cutter shaft can have an inner cutter shaft part 6 and an outer cutter shaft part 7. The blades 1 can be mounted in a replaceable manner on the inner cutter shaft part 6 by means of a blade holder 21 by screwing of the blade holder 21 in the face region of the inner cutter shaft part 6 in the region which faces the perforated plate 2 of the underwater granulator.

The blades 1 can have a spacing $\beta$ from the perforated plate 2 in the rest position. The spacing can be about 1.7 mm. FIG. 1 shows the new condition of the blades 1 with no wear having occurred.

The inner cutter shaft part 6 of the cutter head holder according can be axially displaceable relative to the outer cutter shaft part 7, but is not rotatable relative to the outer cutter shaft part 7. The inner cutter shaft part 6 and the outer cutter shaft part 7 can be arranged to be coaxial, and are rotatable relative to the housing, the flange section 19, the bearing housing section 20, and the process chamber housing section 18 of the underwater granulator.

In the forward region, which is to say in the region facing the perforated plate 2 of the underwater granulator, a front support 8 is provided, by means of which the inner cutter shaft part 6 is axially displaceable relative to the outer cutter shaft part 7. The outer cutter shaft part 7, with the inner cutter shaft part 6 located therein, is rotatably supported relative to the housing of the underwater granulator by rotary bearings 9a and 9b located therebetween. A first rotary bearing 9a can be located in the region of the flange section 19 and a second rotary bearing 9b can be in the region of the bearing housing section 20 of the process chamber 3 in the housing of the underwater granulator shown. The axial bearing and the rotary bearing are implemented separately from one another. The axial bearing is located in the front region toward the blade holder 21 and toward the perforated plate 2, between the inner cutter shaft part 6 and the outer cutter shaft part 7, and the rotary bearings 9a and 9b are located in the rear region, which is to say the region that tends to face away from the perforated plate 2 and is between the outer cutter shaft part 7 and the process chamber 3 in the housing of the underwater granulator there.

Axial sealing between the inner cutter shaft part 6 and the outer cutter shaft part 7 is accomplished by an axial seal 10 in the region of the front support 8, which can be implemented as a plain bearing, as shown in FIG. 1. Sealing of the outer cutter shaft part 7 with respect to the housing of the underwater granulator is accomplished by at least one rotary seal, wherein two such rotary seals 11a and 11b are provided between the outer cutter shaft part 7 and the flange section 19 of the housing of the underwater granulator. The rotary seals 11a and 11b can be O-ring seals, in each case, the applicable axial seal 10 and rotary seals 11a and 11b can be positioned in the region of the applicable supports or bearings.

The cutter shaft can be coupled to a motor shaft 4 of the housing of a motor 5 of the underwater granulator. The rear region of the outer cutter shaft part 7 facing away from the perforated plate 2 can be coupled in a rotationally fixed manner at its rear section 17 to the motor shaft 4 by a feather key 16. A driver element 12 can include at least one drive pin. The driver element 12 is depicted having two opposing drive pins.

The outer cutter shaft part 7 is connected to the inner cutter shaft part 6 in such a manner that, as a result, the rotational motion of the outer cutter shaft part 7 can be transmitted to the inner cutter shaft part 6 and the axial guidance between the outer cutter shaft part 7 and the inner cutter shaft part 6 is provided. In this design, at least one end section of the drive pin is connected indirectly to the outer cutter shaft part 7, and another section of the drive pin, a center section in the case shown, is connected to the inner cutter shaft part 6.

An axial adjusting device is provided, by means of which axial adjustment of the inner cutter shaft part toward the perforated plate 2 can be carried out when wear of the blades 1 occurs. The axial adjusting device can have a threaded sleeve 13, which is rotatable by means of a fine-pitch thread 14 relative to the housing of the underwater granulator in such a manner that a corresponding axial displacement of the inner cutter shaft part 6 relative to the housing of the underwater granulator, and also relative to the outer cutter shaft part 7, consequently takes place by means of the driver element 12 connected to the threaded sleeve 13. For example, two opposing drive pins of the driver element 12 can be displaced axially relative to the outer cutter shaft part 7 by means of the indirect connection to this outer cutter shaft part 7. This is described in more detail in FIG. 3.

The front support 8 can be in a forward region of approximately 30 percent of the length of the inner cutter shaft part 6. The front support 8 can be provided in the region of about the front 5 percent to the front 20 percent of the inner cutter shaft part 6.

In the other figures, like reference characters describe like elements of the inventive device, wherein the corresponding explanations provided above apply here as well. Certain reference characters of like elements have been left off of some figures for clarity.

Figure 2:
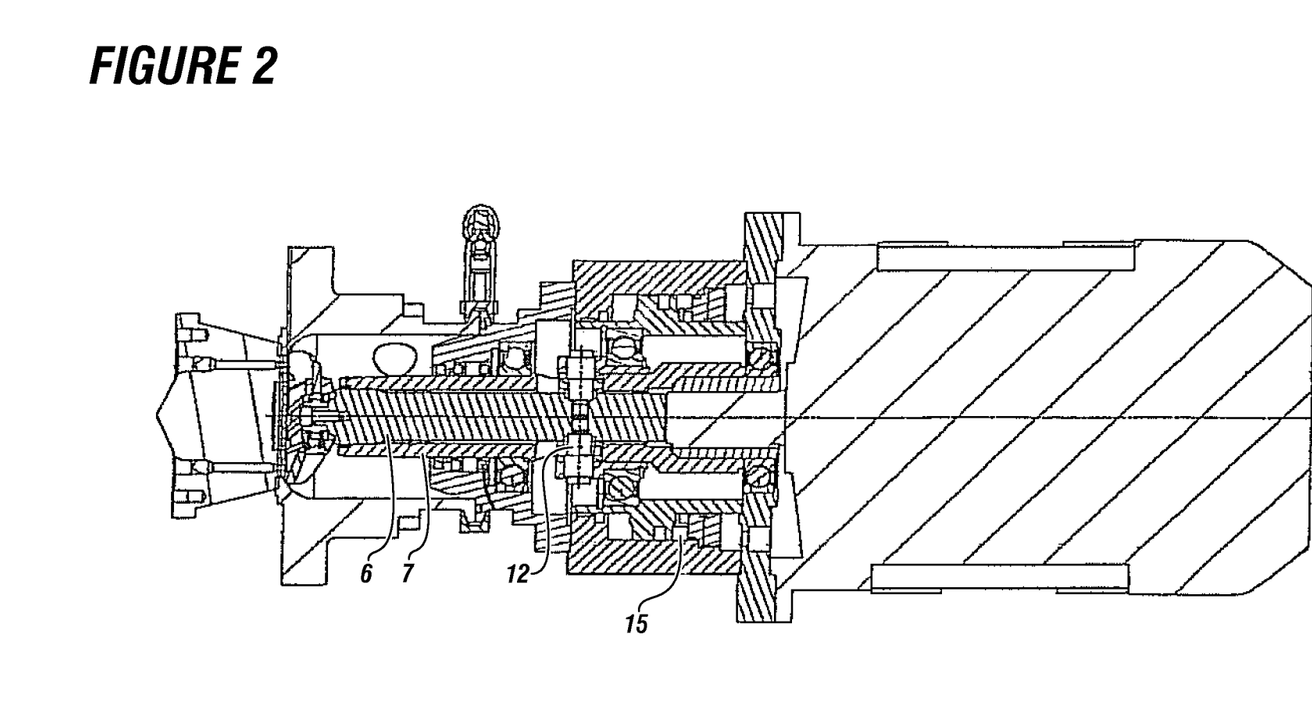
FIG. 2 depicts a schematic cross-sectional view of an underwater granulator with a cutter head holder that can be adjusted by means of operating fluid according to another embodiment of the invention in the rest position.

FIG. 2 shows a schematic cross-sectional view of an underwater granulator with a cutter head holder that can be adjusted by means of operating fluid in the rest position.

The device from FIG. 2 differs from the device in FIG. 1 solely in that the axial adjustability of the inner cutter shaft part 6 relative to the outer cutter shaft part 7 or relative to the housing of the underwater granulator is accomplished in the case of FIG. 2 by an axial adjusting device, which has an actuating fluid section 15, which can be designed as a pneumatic section operated with compressed air, as for instance in the example shown, or can be designed as a hydraulic section operated with hydraulic fluid.

A variable cavity facing the housing is provided there, which is connected to an operating fluid source (a compressed air source in the example, albeit not shown), so that when pressure builds up in the region of the cavity of the actuating fluid section 15, the cavity enlarges, and as a result the two opposing connected drive pins of the driver element 12 transmit the corresponding motion of the displaceable part of the actuating fluid section 15 to the inner cutter shaft part 6, and a corresponding axial displacement of the inner cutter shaft part 6 takes place relative to the housing of the underwater granulator or relative to the outer cutter shaft part 7.

The operating fluid section 15 with the variable cavity is implemented as a double acting cylinder, with a first cavity facing away from the perforated plate and a second cavity facing the perforated plate, and with an intermediate element located therebetween having the functionality of a piston, as well as a corresponding actuating fluid control device (not shown), so that axial motion/displacement and/or application of force both toward the perforated plate and away from the perforated plate is made possible by means of the intermediate element.

Figure 3:
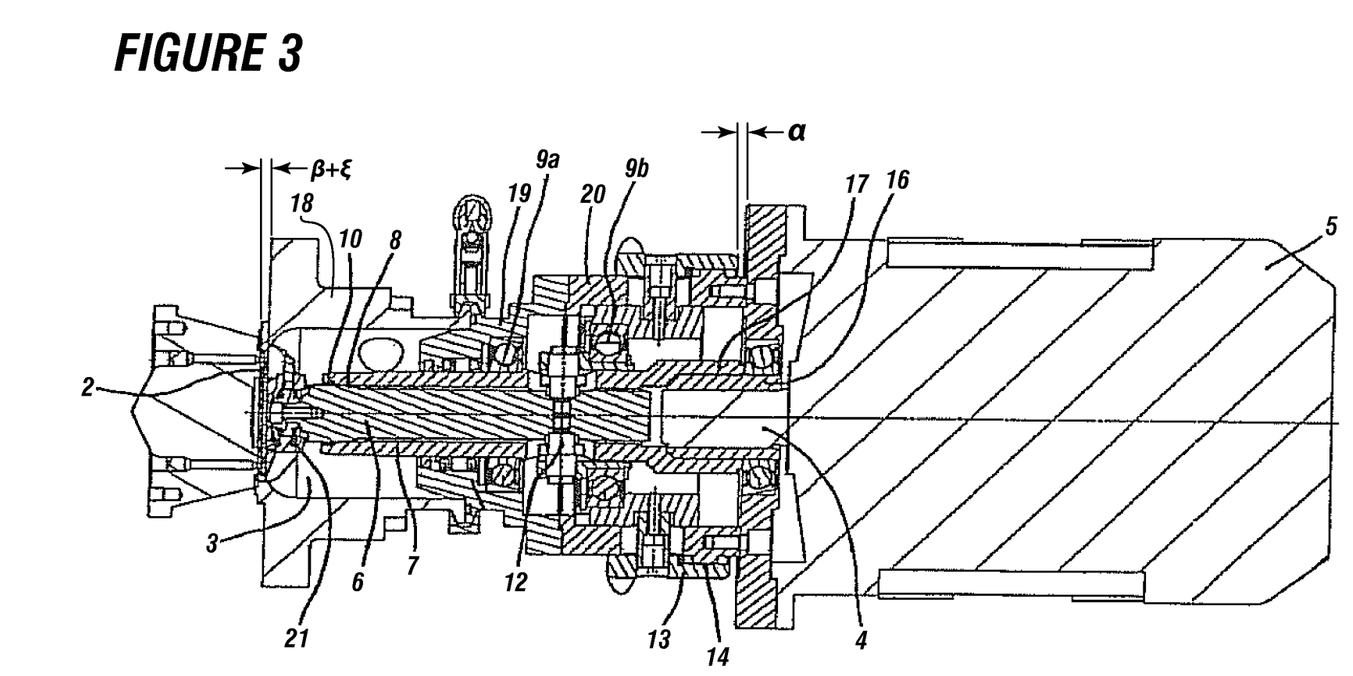
FIG. 3 depicts a schematic cross-sectional view of the device from FIG. 1 in the operating position when wear has occurred.

FIG. 3 shows a schematic cross-sectional view of the device from FIG. 1 in the operating position when wear has occurred. After a rotation of the manual axial adjustment device by means of a threaded sleeve 13, an advancement of the blades from the rest position toward the perforated plate 2 occurs.

The device can include the motor 5, process chamber 3 in the housing, the flange section 19, the bearing housing section 20, the process chamber housing section 18, the inner cutter shaft part 6, the outer cutter shaft part 7, an axial seal 10, the front support 8, rear section 17 to the motor shaft 4 by a feather key 16, the driver element 12, the threaded sleeve 13, the fine-pitch thread 14, the blade holder 21, and rotary bearings 9a and 9b.

For example, the manual axial adjustment travel $\alpha$ to the housing of the underwater granulator or relative to the outer cutter shaft part 7, an advancement of the blade of spacing $\beta$, which can be 1.7 mm, can take place, the adjustment can also compensate for the wear $\epsilon$, for example, 5 mm, in the blades. The displacement can be $\beta+\epsilon=\alpha$. For example, if the wear is 5 mm, the spacing $\beta$ is 1.7 mm the total displacement can be 1.7 mm travel from the rest position+5 mm wear=6.7 mm total adjustment travel.

Figure 4:
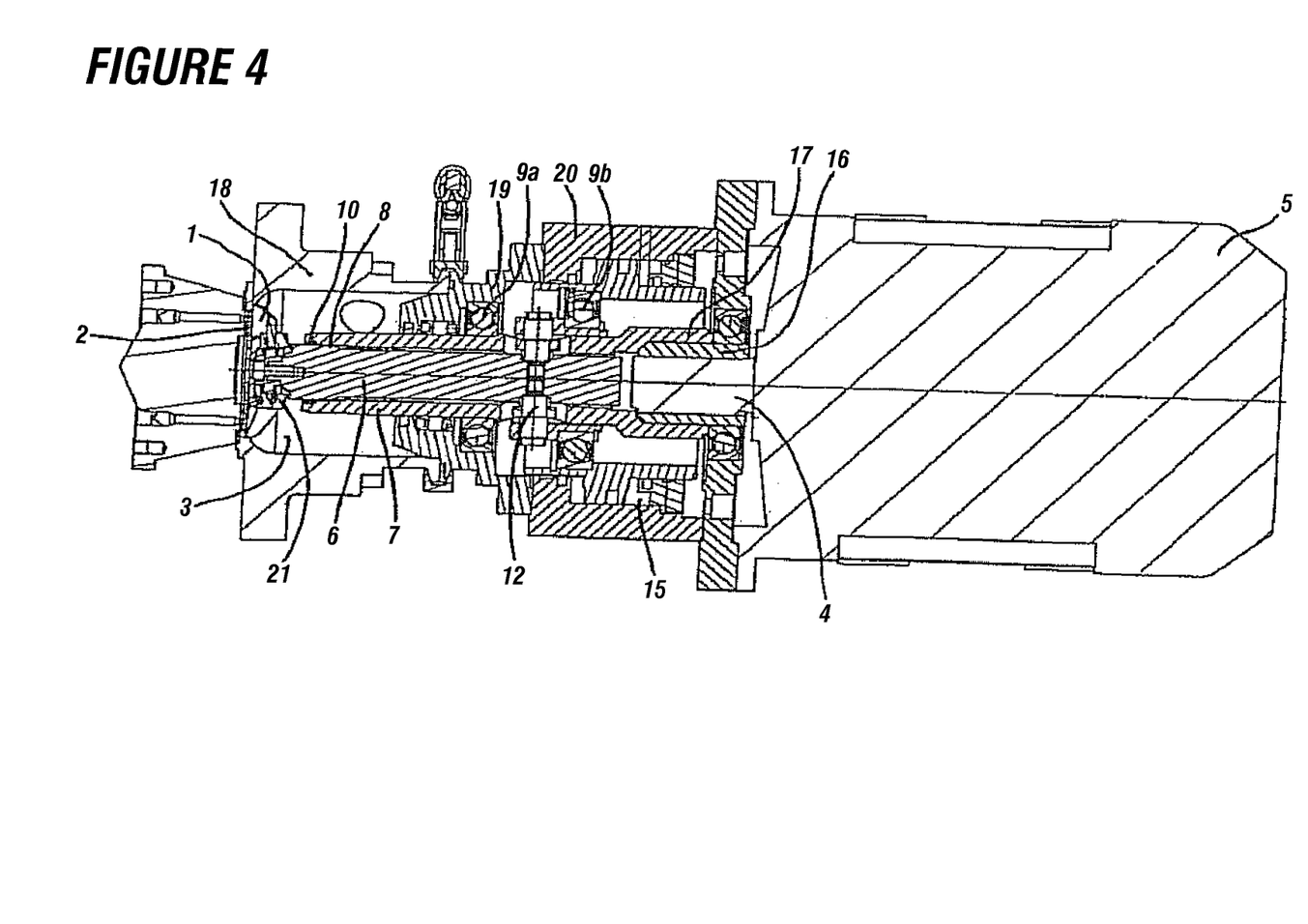
FIG. 4 depicts a schematic cross-sectional view of the device from FIG. 2 in the operating position when wear has occurred.

FIG. 4 shows a schematic cross-sectional view of the device from FIG. 2 in the operating position when wear has occurred, corresponding to the representation in FIG. 3. In the case of the representation in FIG. 4, the axial adjustment is accomplished by the buildup of pressure in the region of the variable cavity of the actuating fluid section 15 and corresponding transmission to the inner cutter shaft part 6 to advance the blades 1 from the rest position toward the perforated plate 2.

The device can include the process chamber 3 in the housing, the flange section 19, the bearing housing section 20, the process chamber housing section 18, the inner cutter shaft part 6, the outer cutter shaft part 7, an axial seal 10, the front support 8, rear section 17 to the motor shaft 4 by a feather key 16, the driver element 12, the blade holder 21, rotary bearings 9a and 9b, the perforated plate 2, and the motor 5.

The inventive device as a whole can be suspended from a slide rail, and can be axially movable, by means of a suspension, wherein the suspension can be provided on the housing of the motor and/or on the housing of the underwater granulator. The suspension can be provided in the region of the flange section of the housing of the underwater granulator (the suspension is not shown in the figures).

While these embodiments have been described with emphasis on the embodiments, it should be understood that within the scope of the appended claims, the embodiments might be practiced other than as specifically described herein.

What is claimed is:

1. A cutter head holder for blades of an underwater granulator for granulating pellets from a plastic melt that emerges from a perforated plate into a process chamber in a housing of the underwater granulator, wherein the cutter head holder comprises:
   a. a cutter shaft coupled to a motor shaft of a motor of the underwater granulator, wherein the cutter shaft comprises:
      (i) an inner cutter shaft part, wherein the inner cutter shaft part has a blade holder securing blades to the inner cutter shaft part;
      (ii) an outer cutter shaft part at least partially disposed about the inner cutter shaft part, wherein the outer cutter shaft part and the inner cutter shaft part are axially displaceable relative to one another, and wherein the inner and the outer cutter shaft parts are prevented from rotating relative to one another;
      (iii) a front support in a forward region that faces the perforated plate of the underwater granulator so as to be axially displaceable relative to the outer cutter shaft part, wherein the front support supports the outer cutter shaft part, and wherein the outer cutter shaft part is supported to be rotatable relative to the housing of the underwater granulator by at least one rotary bearing; and
      (iv) a driver element for connecting the inner cutter shaft part to the outer cutter shaft part, wherein the driver element transmits rotational force and axial force between the inner cutter shaft part and the outer cutter shaft part, and further wherein the driver element comprises at least one drive pin connected to both the inner cutter shaft part and the outer cutter shaft part.

2. The cutter head holder of claim 1, wherein the front support is in the forward region of up to 30 percent of a length of the inner cutter shaft part.

3. The cutter head holder of claim 1, wherein the front support is a plain bearing.

4. The cutter head holder of claim 2, wherein the front support is a plain bearing.

5. The cutter head holder of claim 1, wherein the front support is a plain bearing.

6. The cutter head holder of claim 1, wherein the outer cutter shaft part is sealed in an axially displaceable manner with respect to the inner cutter shaft part in the region of the front support by an axial seal.

7. The cutter head holder of claim 1, wherein the outer cutter shaft part is rotatably sealed with respect to the housing of the underwater granulator by at least one rotary seal.

8. The cutter head holder of claim 1, wherein an axial adjusting device is provided, which is connected by the driver element to the inner cutter shaft part.

9. The cutter head holder of claim 8, wherein the axial adjusting device has an operating fluid section with at least one cavity facing the housing of the underwater granulator or a housing of the motor and connected to an operating fluid source, so that a suitable axial displacement of the inner cutter shaft part takes place by means of the driver element as a result.

10. The cutter head holder of claim 9, wherein the operating fluid section has a double acting cylinder.

11. The cutter head holder of claim 1, wherein the outer cutter shaft part is coupled to the motor shaft in a rotationally fixed manner, by a feather key located between the motor shaft and a rear section of the outer cutter shaft part.

12. The cutter head holder of claim 1, wherein the blades are mounted on the inner cutter shaft part by a blade holder.

13. The cutter head holder of claim 1, further comprising a suspension connected with a housing of the motor, the housing of the underwater granulator, or combinations thereof.

14. The cutter head holder of claim 1, further comprising a process chamber housing section and a bearing housing section that is attached thereto by a flange section and to which a housing of the motor is attached.

\* \* \* \* \*